April 5, 1966  R. E. DE KAY  3,244,026
SPEED CHANGING DEVICE
Filed March 22, 1963  2 Sheets-Sheet 2
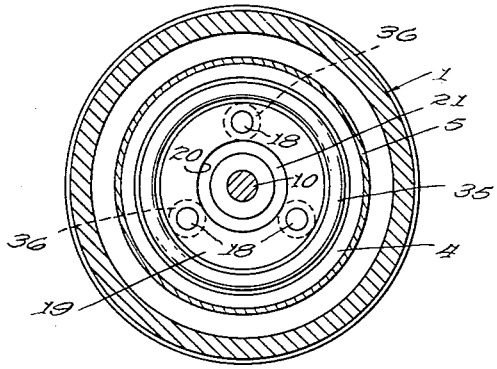
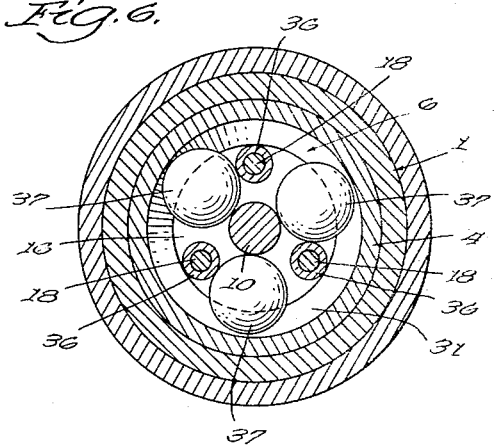
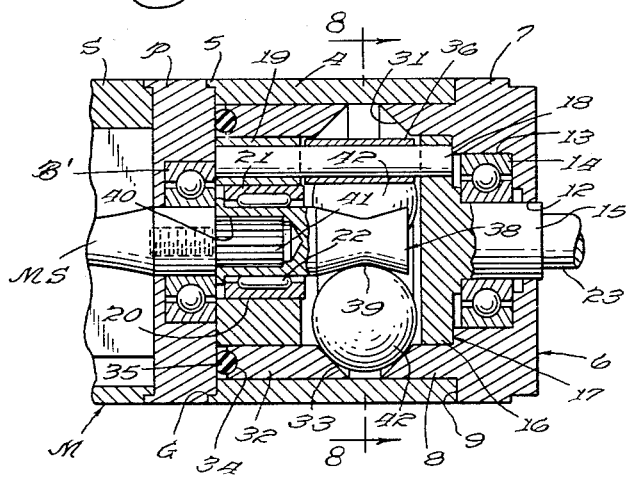
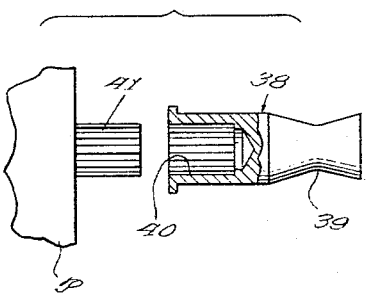
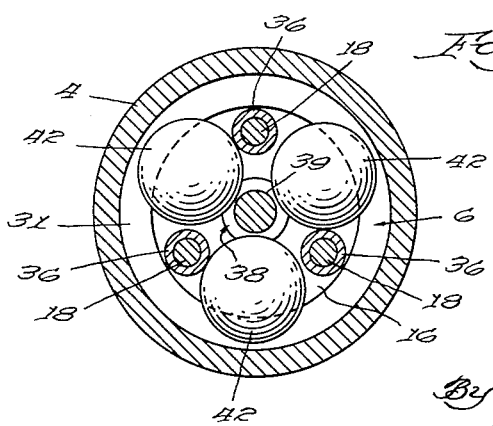
Inventor:
Robert E. De Kay.
By Harold L. Vescont
Atty.

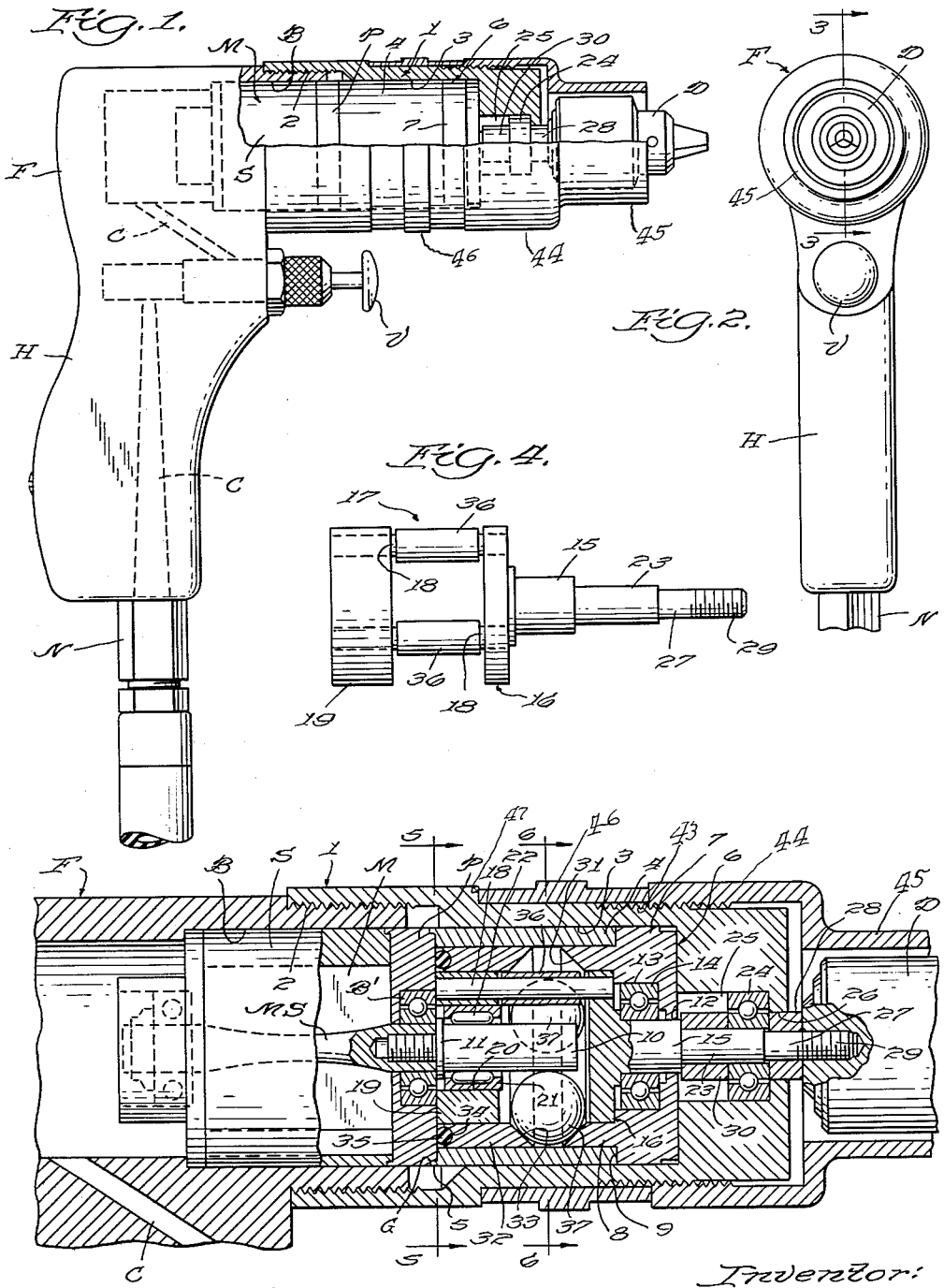

United States Patent Office 3,244,026
Patented Apr. 5, 1966

3,244,026
SPEED CHANGING DEVICE
Robert E. De Kay, Montebello, Calif., assignor to Symington Wayne Corporation, Salisbury, Md., a corporation of Maryland
Filed Mar. 22, 1963, Ser. No. 267,176
7 Claims. (Cl. 74—798)

This invention relates to rotary power tools and more particularly to a speed changing unit for use therewith and while the illustrated embodiment of the invention relates to speed reduction, as the description of the invention proceeds, it will be realized that by applying power to the opposite end of the device from that illustrated, it is also capable of functioning as a speed multiplying means. Because of this capability, it is designated as a speed changing unit or means.

An object of the invention is to provide a speed changing transmission means for use in hand held power tools which is characterized by small size, simple economical construction and efficient friction drive whereby a high speed light weight motor can be effectively employed for work at tool rotation speeds at which the motor would not be efficient.

Another object of the invention is to provide a speed changing transmission mechanism of the above character embodying resilient means for constantly and uniformly applying a predetermined load on the driving and driven elements sufficient to transmit the power from the driving to the driven elements.

A further object of the invention is to provide a speed changing transmission means characterized by the use of balls for the power transmitting means.

A still further object of the invention is to provide a planetary type speed changing means which is so constructed and arranged that removal of the enclosing housing serves also to permit the entire mechanism to be dismantled for inspection and repair.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a side elevational view of a hand tool driven by an enclosed air motor with a portion of the housing broken away to show the exterior of the air motor, the speed changing means of the present invention and a drill chuck fixed to and being driven by the said speed changing means, FIG. 2 is an end elevational as viewed from the right hand end of FIG. 1, FIG. 3 is a greatly enlarged view on the line 3—3 of FIG. 2 showing the motor and the first embodiment of the speed changing means of the present invention as well as a mode of attachment thereto of a drill chuck, FIG. 4 is a side elevational view of the driven shaft assembly of the device, FIGS. 5 and 6 are transverse sectional views taken on the lines 5—5 and 6—6, respectively, of FIG. 3, FIG. 7 is a longitudinal medial sectional view of an alternative embodiment of the transmission means of the present invention, FIG. 8 is a sectional view taken on the line 8—8 of FIG. 7, and FIG. 9 is an exploded view of the driving shaft in connection thereof with the motor shaft employed in the said second embodiment of the invention.

Referring first to FIGS. 1–6, the speed changing means is shown as applied to a manually portable and dirigible air motor means comprising a frame F having a piston grip type handle H provided with a nipple N for attachment to a source of supply of compressed air and with a valve operating plunger V by which compressed air is supplied to air channels C, C to a sliding vane type of compressed air rotary motor M having a cylindrical stator S mounted in a bore B of the frame F. The forward end of the motor includes an end plate P the outer face of which protrudes out of the bore B and the motor shaft MS is journaled in a bearing B' in the center of said end plate and in a corresponding bearing at the other end of the stator.

The outer surface of the distal end of the frame F in which the motor M is seated, is externally threaded for engagement with the end of a cylindrical transmission housing 1 having a correspondingly interiorly threaded rear end 2. For convenience in description, all faces or portions of components of the invention extending toward the handle of the device will be referred to as the "rear," and, correspondingly, "front" will indicate portions or elements extending toward the drill chuck end of the apparatus.

Immediately forwardly of the threaded rear end 2, the housing 1 is provided with a slightly smaller, coaxially disposed bore 3 in which the hollow cylindrical body 4 of the transmission means is seated; said body at the rear end thereof having an annular ledge 5 at the outer edge thereof which engages a complementary groove G on the forward motor end plate P, whereby the transmission body 4 is maintained in axial alignment with the end plate P and the motor shaft MS protruding therethrough. The end plate P thus serves additionally as the end of the transmission housing formed by the body 4, the said end plate P and an end member 6 having a forward end 7 closely fitting the forward end of the bore 3 and a rearwardly extending reduced diameter annular portion 8 closely fitting the interior diameter of the body 4; the said end 7 and annular portion 8 combining to form a shoulder 9 engaging the forward end of the transmission body member 4 and closing said end.

The forward end of the motor shaft is internally threaded to receive the mating end of the transmission drive shaft 10 constituting a free ended stub shaft having a flange 11 engaging both the end of the motor shaft and the forward end of the inner race of the ball bearing B'. The transmission housing front end member 6 is provided with an axial bore 12 terminating on the inner face thereof in a counterbore 13 in which the outer race of a ball bearing 14 is seated.

The inner race of the ball bearing 14 carries the shank portion 15 of the front head 16 of the driven shaft assembly 17; said front head carrying the front ends of three equally peripherally spaced, rearwardly extending pins 18 which at their rear ends are similarly mounted in the rear head member 19 of the said driven shaft assembly and said rear head member is provided with an axial bore 20 in which the outer race 21 of a needle roller bearing assembly is mounted with the needle rollers 22 thereof engaging the rear portion of the drive shaft 10 as the inner race of that bearing. The shank 15 carries an integrally formed, axially aligned shaft 23 carried in the inner race of a ball bearing 24 which is disposed in a counterbore 25 in the forward end of the housing 1 said counterbore terminating in a smaller bore 26 axially aligned with said counterbore and extending through the front end of the housing 1. Forwardly of the shaft portion 23, it continues in a reduced diameter portion 27 journaled in a bushing 28 in the said bore 26 and beyond the bushing 28, it terminates in a threaded distal end 29 on which a drill chuck D or other tool holding instrumentality may be mounted, it being noted that the shaft portion 23 carries a spacer bushing 30 interposed between the shoulder formed by the shaft portions 15 and 23 and the inner race of the bearing 24 and that the bushing 28 is interposed between the inner race of the bearing 24 and the rear end face of the drill chuck D whereby all end play of the driven shaft assembly is eliminated.

The rear end of the annular portion 8 of the front end member 7 is formed as a rearwardly flaring, frusto-conical face 31. Slidably mounted in the rear end of the body 4 is an annular shell 32 having a forwardly flaring frusto-conical front end face 33 spaced from and opposing the face 31. The rear end face of the shell 32 is provided with an annular groove 34 in which a resilient O-ring 35 is seated to bear against the front face of the end plate P and to resiliently urge the shell 32 toward the end face 31 of the front end member 7. The pins 18 constitute a ball retaining cage and each pin carries a freely rotatable sleeve 36. Disposed between adjacent ones of said sleeves are bearing balls 37 formed of hardened metal and which have rolling engagement with the opposed faces 31 and 33 and which by reason of the endwise pressure exerted on the shell 32 and the reaction between the opposing frusto-conical faces 31 and 33 are forced into tight frictional engagement with the stub shaft 10. At this point it is well to note that the entire assembly is held together by screwing the housing 1 onto the end of the motor frame F with resultant endwise pressure on the end member 6 thus causing the body 4 to tightly engage the end plate P, it being noted that the proportions of the annular portion 8 and the sleeve 32 are such in relation to the diameter of the balls 37 and the diameter of the stub shaft 10 that the resilient ring 35 is sufficiently compressed to exert the necessary force to achieve satisfactory driving engagement and to hold the components forming the track against rotative movement.

As the stub shaft 10 is rotated by the motor M the balls 37 are caused to roll along the V-shaped track formed by the opposed frusto-conical surfaces 31 and 33 and to contact the sleeves 36 surrounding the pins 18 and through this rolling action to cause rotation of the driven shaft assembly and the chuck or other tool carrying instrumentality carried thereby, it being noted that the applied force or loading is sufficient to achieve normal actuation of the tool or tools to be driven but being capable of slipping in the event of opposition to tool rotation with such magnitude as to be likely to break the tool or otherwise cause unintended damage. It will also be noted that since the stub shaft is supported at three peripherally spaced points by the balls 37, no outboard bearing therefor is required and that while a series of three ball bearings are shown, it will be appreciated that a greater number may be employed if desired. The ratio of speed reduction in the device is used as illustrated would be that of the diameter of the stub shaft 10 to the diameter of the circle on the surfaces 31 and 32 engaged by the balls. Still further, it will be obvious that while the invention is shown as employed for speed reduction, applying power to the drill chuck or driven end thereof will enable the device to be used as a speed multiplying means.

Referring finally to FIGS. 7, 8 and 9, a modification is shown in which the stub shaft 10 is replaced by a driving shaft element 38 having a shallow, V-shaped ball engaging peripheral groove or track 39 and having a splined socket 40 at the rear end thereof which is freely slidingly received on a complementary splined stud 41 carried by the motor shaft MS and which projects through the end plate P. This splined connection permits the drive shaft element 38 to shift axially to accommodate the balls 42 as they are held in a path by the conical end faces 31 and 33. As will be seen in FIG. 8, the engagement of the balls with the shaft element 38 eliminates the need for any outboard bearing for that element. This modification of the invention, while slightly more complicated than the first described embodiment possesses the advantage of affording equal contact for the balls on the driving and driven members with resultant increase of driving efficiency for a given contact loading imposed by the resilient ring 35. All of the parts of the said second embodiment of the invention which are the equivalent of those of the first embodiment have been given the same numbers to avoid repetition in describing them.

The forward end of the housing 1 is externally threaded at 43 for reception of the rear end 44 of a drill chuck guard having a skirt portion 45 spaced from the body of the chuck D. An interposed collar 46 engaging a shoulder 47 on the housing 1 affords an abutment for the rear end of the drill chuck guard.

While in the foregoing specification there have been disclosed certain presently preferred embodiments of the invention, it is not to be inferred therefrom that the invention is limited to the precise details of construction thus disclosed by way of example, and it will be understood that the invention includes as well all such changes and modifications in the parts and in the construtcion, combination and arrangement of parts as shall come within the purview of the appended claims.

I claim:

1. In a friction drive speed changing mechanism, a stub shaft having a bearing supported end and a free end and constituting a higher speed shaft, a second shaft constituting a lower speed shaft disposed beyond the free end of said stub shaft and in the axial line of said stub shaft, a housing enveloping said shafts and supporting a bearing emans for said second shaft and having an end wall provided with an axial bore extending therethrough and through which bore an end of said second shaft projects, a ball retaining cage means carried by said second shaft within said housing and having a bearing disposed coaxially exteriorly of the bearing support for said stub shaft, a plurality of at least three bearing balls held in peripherally spaced relation to each other by said cage means and contacting said stub shaft forwardly of said bearing supported end thereof, a circular ball engaging and retaining track means of modified V-shaped cross-section configuration carried by said housing and disposed exteriorly of said cage means, and resilient means associated with said track means tending constantly to reduce the width thereof with resultant creation of radially inward pressure on said balls of a magnitude sufficient to establish motion transmitting engagement of said balls with said stub shaft and said track with resultant driving of said cage means deriving from the rolling of said balls along said track.

2. A friction drive speed changing mechanism as claimed in claim 1 in which said cage means constitutes a front head on said second shaft, a rear head journaled on said first named shaft adjacent the bearing support therefor and a plurality of pins extending parallel to the axes of said shafts between said front and rear heads in peripherally spaced relation to each other and at a radial distance from said axial line intermediate the radial dimensions of said stub shaft and said track.

3. A friction drive motion transmitting mechanism as claimed in claim 1 in which said stub shaft is externally splined and carries an internally splined extension component which is slidable and non-rotatable thereon and which is provided with a V-shaped peripheral groove forming a track for engagement by said balls; the said splined connection permitting the track on said shaft extension component to be self-aligning with said track carried by said housing.

4. In a power tool having a frame and a rotatable motor mounted on the frame, a friction drive speed reduction mechanism comprising a hollow cylindrical housing supporting bearing means for a driven shaft at one end thereof and having the other end internally threaded for detachable engagement with the power tool frame, a driving shaft of said mechanism fixed to the rotating component of the motor for rotation therewith and contained within said housing, a driven shaft journaled in said bearing supported by said housing disposed forwardly of and in axial alignment with said driving shaft, a cylindrical, transmission supporting body disposed within said housing, means carried by said body forming a circular track of modified V-shaped cross-sectional configuration disposed in coaxial relation to and spaced radially from said driving shaft, a series of at least three bearing balls contacting both said driving shaft and said track, a cage means carried by said drive shaft and disposed within said body engaging and holding said bearing balls in peripherally spaced relation, and resilient means within said body constantly effective to create an initial load on the engagement of said balls with said track and said driving shaft of a magnitude sufficient to effect motion transmitting therewith with resultant rotation of said cage means and said driven shaft deriving from rolling of said balls along said track.

5. A friction drive speed reduction mechanism as claimed in claim 4 in which said housing carrying said cylindrical body is disposed with one end thereof in engagement with a portion of the power tool frame, in which the opposite end of said body is engaged by an end member having a shoulder engaging said opposite end of said body; said end member further having a sleeve portion entering and closely fitting said body and a bearing supporting said driven shaft and, in which a shoulder on said housing is disposed in engagement with the end of said end member which is exterior to said body and is operative upon screwing said housing member onto the power tool frame to hold said body and said end member in assembly with each other and with the power tool frame.

6. A friction drive speed reduction mechanism as claimed in claim 4 in which said driving shaft is externally splined and carries an internally splined component which is slidable and non-rotatable thereon and which is provided with a V-shaped peripheral groove forming a track for engagement by said balls; the said splined connection permitting said track on said shaft extension component to be self-aligning with said track carried by said housing.

7. A friction drive speed reduction mechanism as claimed in claim 5 in which said sleeve portion of said end member terminates within said body in a rearwardly flaring end face constituting one side of said V-shaped track, in which the opposite end of said body carries a sleeve slidable therein and having a forwardly flaring end face opposing said flaring end face on said end member and constituting the opposite side of said track, and in which a rubber ring interposed between the rear end of said sleeve and the end face of said frame constitutes said resilient means.

References Cited by the Examiner
UNITED STATES PATENTS

| | | | |
|---|---|---|---|
| 2,101,594 | 12/1937 | Pensbee | 74—798 |
| 2,828,907 | 4/1958 | Oehrli | 74—798 X |
| 2,868,039 | 1/1959 | Lee | 74—798 |
| 3,084,570 | 4/1963 | Holder | 74—798 |

DON A. WAITE, *Primary Examiner.*